UNITED STATES PATENT OFFICE.

RUDOLF E. HELLMUND, OF SWISSVALE, PENNSYLVANIA, ASSIGNOR TO WESTING-HOUSE ELECTRIC & MANUFACTURING COMPANY, A CORPORATION OF PENNSYLVANIA.

SYSTEM OF CONTROL FOR INDUCTION-MACHINES.

1,398,515.      Specification of Letters Patent.     Patented Nov. 29, 1921.

Application filed May 15, 1917. Serial No. 168,664.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control for Induction-Machines, of which the following is a specification.

My invention relates to systems of control for induction machines, and it has for its object to provide a system whereby machines of the character designated may be simply, efficiently and effectively accelerated during motoring action or whereby an effective and readily controlled braking action may be obtained therefrom during recuperation.

More specifically, my invention relates to the type of control system wherein a frequency-changer is employed between the source and the secondary member of the induction machine, the frequency changer being operatively related with different portions of a cascade circuit as will hereinafter be more fully pointed out.

Figure 1:
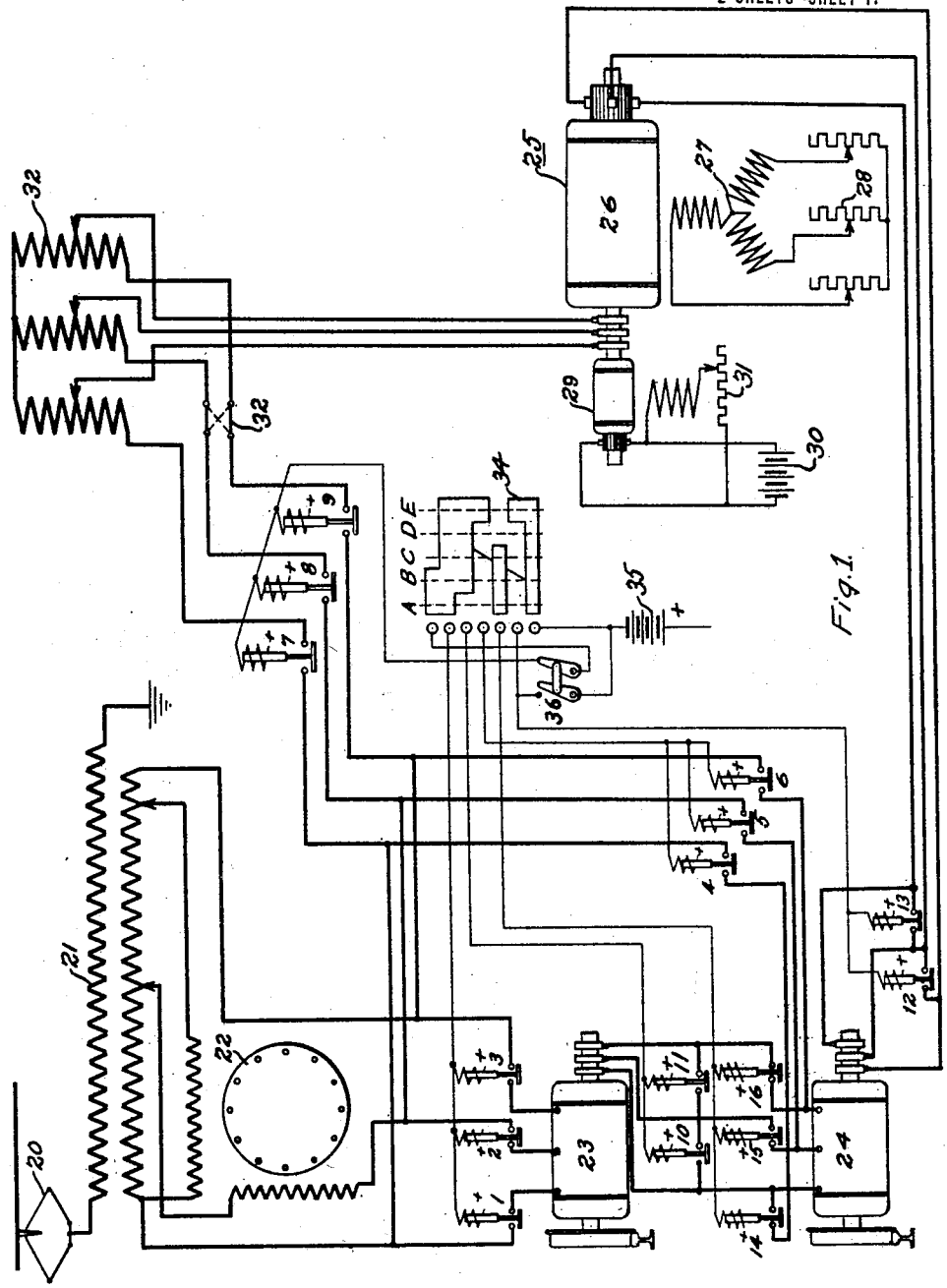
Figure 2:
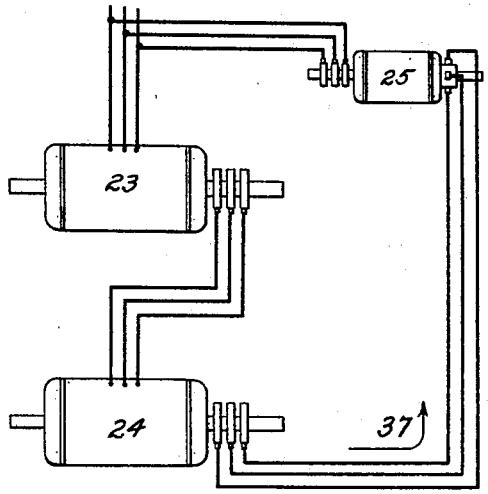
Figure 3:
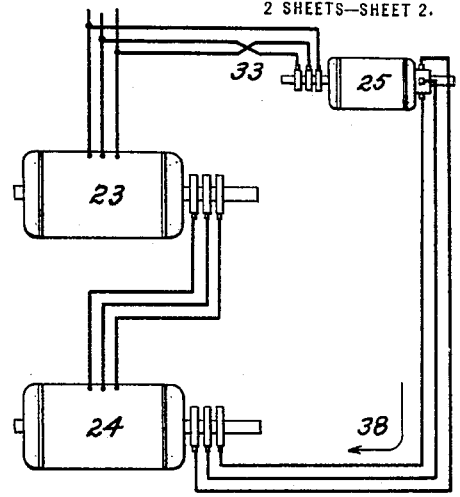

In the accompanying drawing, Figure 1 is a diagrammatic view of two induction machines, together with associated supply and control circuits and auxiliary apparatus, illustrating a preferred form of my invention and Figs. 2, 3, 4 and 5 are simplified diagrammatic views illustrating different phases in the development of the connections in the system of Fig. 1.

Systems of speed control for induction motors are well known wherein a frequency-changer is connected between the source and the secondary member of the motor, said frequency changer being employed to transfer energy from the secondary member to the source during under-synchronous operation and from the source to the secondary member during over-synchronous operation. The size of frequency changer necessary to perform this function has hitherto been a serious disadvantage in the employment of systems of this character. The rating of the auxiliary machine must bear the same percentage ratio to the rating of the main machine as the percentage speed divergence from synchronism; that is to say, if regulation from 70% of synchronous speed up to synchronism is desired, it is necessary to employ an auxiliary machine having 30% of the rating of the main machine.

Cascade systems of connections for induction motors are also well known in which energy from the secondary member of one motor is transferred to the primary member of the second motor. The energy in either motor is but a portion of the total energy of the system.

By my invention, I avail myself of the advantages of both of the aforementioned systems, employing an auxiliary frequency changer in conjunction with two or more induction machines, said frequency-changer being employed at times in transferring energy from the secondary member of the last of a series of concatenated motors to the source, and being employed at other times in transferring energy from the source to the secondary member of said last motor in a concatenated series, the motors further being capable of operation, either in multiple from the source with closed secondary members or in ordinary cascade.

Furthermore, the motors thus described, together with their control apparatus, may be employed for recuperation with the same advantages as in ordinary motoring action.

Referring to the drawing for a more detailed understanding of my invention, I show a source of alternating-current, such as a single-phase railway trolley, at 20 in Fig. 1. Said source energizes a vehicle transformer 21 which, in turn supplies energy to a phase-converter 22 of any desired form, whereby polyphase alternating-current is provided for supply to two propulsion motors 23 and 24 of the polyphase induction type.

A frequency-changer 25 is further mounted on the railway vehicle and may assume any well known form, being shown as provided with an armature 26 having a polyphase commutator at one end and slip rings at the other, said armature being subject to the polyphase field produced by a field winding 27 which is closed through a polyphase resistor 28. The armature 26 may be caused to rotate at any desired speed by means of a suitable driving motor 29 deriving energy from a suitable source 30 and having its field strength adjustable by means of a resistor 31.

The primary member of the motor 23 may be connected directly to the polyphase source by the closure of suitable switches, 1, 2 and 3 and the primary member of the motor 24 may be similarly connected by the closure of suitable switches 4, 5 and 6. The primary member of the motor 24 may further be connected to the terminals of the secondary member of the motor 23 by the closure of switches 14, 15 and 16 for cascade operation. The secondary member of the motor 24 may be connected to the polyphase source through the frequency changer 25 by the closure of suitable switches 7, 8 and 9, said connection preferably being made through an adjustable transformer 32 for voltage regulation. The secondary member of the motor 23 may be closed upon itself by suitable switches 10 and 11 and, in like manner, the secondary member 24 may be closed upon itself by suitable switches 12 and 13. Two of the leads between the polyphase source and the transformer 32 may be interchanged, as by a switching mechanism 33, in order to reverse the direction of phase rotation between the polyphase source and the motor 24, for a reason to be hereinafter more fully pointed out. The switches 1 to 16, inclusive, may be of any desired type, either manually operable or power operated and, if power operated, the operating mechanism may be either pneumatic, electromagnetic or assume other forms. As shown, said switches 1 to 16, inclusive, are of the electromagnetically operated type, being subject to control by the movement of a master controller 34, operating energy being derived from a suitable source 35. Switching mechanism 36 may be provided which, by its operation, either opens or closes the energizing lead to the switches 7, 8 and 9, and simultaneously closes or opens an energizing connection to the switches 12 and 13, for a purpose to be hereinafter pointed out.

Having thus described the arrangement of a system embodying my invention, the operation is as follows: At the outset, the trolley being energized and the phase converter 22 being in operation, polyphase energy is available for supply to the propulsion motors 23 and 24. The controller 34 is moved to the position A, whereupon the switches 1, 2, 3, 7, 8, 9, 14, 15 and 16 are closed. The rheostat 31 is adjusted so that the frequency converter 25 produces a secondary frequency in the motor 24 which is but little below the supply frequency. In other words the ratio of frequency conversion in the machine 25 is relatively low. Under these conditions, the net or resultant frequency applied to the motors 23 and 24 is relatively small, being the difference between the supply frequency and the frequency produced in the machine 25. The arrangement of connections established is indicated diagrammatically in Fig. 2, the two motors being connected in cascade and energy flowing from the motor 24 back to the source through the converter 25, as indicated by an arrow 37.

In order to accelerate the motors 23 and 24 up to cascade synchronism or one-half synchronous speed, the rheostat 31 is now adjusted so as to gradually increase the ratio of conversion in the machine 25, gradually lowering the frequency imposed upon the secondary member of the motor 24. At the same time, the transformer 32 is adjusted to lower the secondary voltage of the motor 24. Thus the effective frequency for the energization of the two motors 23 and 24 gradually increases and said motors are accelerated in a smooth and efficient manner.

Figure 5:
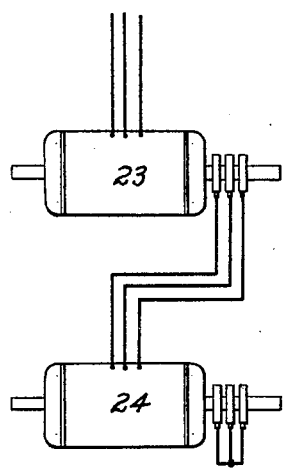

This operation is continued until substantially cascade synchronous speed or one-half full synchronous speed is attained. If it be desired to operate at this speed, the switch 36 may now be thrown to the left, opening the switches 7, 8 and 9 to break the connection through the frequency changer 25 and, at the same time, the switches 12 and 13 are operated to close the secondary member of the motor 24 upon itself. Thus the ordinary cascade connection shown in Fig. 5 is established.

If it now be desired to operate through cascade synchronism and to obtain speed regulation over the range between cascade synchronism and true synchronism, the frequency converter 25 is so adjusted in speed by the rheostat 31 that it operates as a rotary converter, supplying direct current to the secondary member of the motor 24 and permitting cascade synchronous operation, the motors 23 and 24 operating temporarily as synchronous motors. At this instant, the switch 33 is reversed, producing no effect upon the connection between the polyphase source and the secondary member of the motor 24, the phase rotation of the energy supply at said secondary member being temporarily at standstill and, therefore, subject to reversal without operative effect, the sole action being to cause one of the brushes of the machine 25 to change polarity, the polarity of the other two brushes remaining unchanged.

The speed of the frequency changer 25 is now slowly diminished, permitting an increase in the frequency supplied to the secondary motor 24 and gradually accelerating the motors 23 and 24, the voltage obtained through the transformer 32 being simultaneously increased to permit the building up of the secondary voltage of the machine 24. In this way, the machines 23 and 24 may be accelerated to substantially true synchronous speed. The operation of the system during this portion of the control sequence is shown diagrammatically in Fig. 3, the motors 23 and 24 being connected in cascade and energy being supplied to the secondary member of the motor 24 through the frequency changer 25, as indicated by an arrow 38.

Figure 4:
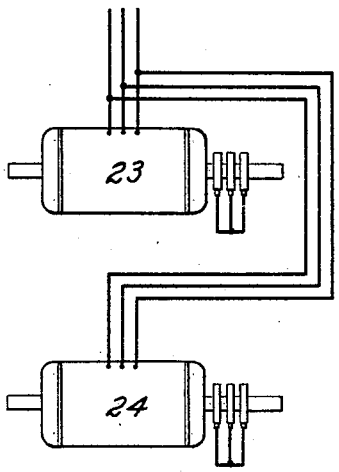

If it now be desired to change to ordinary multiple operation, the controller 34 is operated through the positions B, C, D and E, successively, first closing the switches 10 and 11 so that the motor 23 is enabled to operate alone, then opening the switches 7, 8 and 9 and the switches 14, 15 and 16, finally closing the switches 4, 5, 6, 12 and 13, establishing the ordinary multiple connection of Fig. 4 and permitting operation at slightly below true synchronous speed.

Throughout the accelerating process, the rheostat 28 may be adjusted to control the power factor of the system in a well known manner, this feature being of extreme importance as the cascade connection inherently produces rather poor power factor.

By the use of the foregoing system, it will be noted that, for a given range in speed adjustment, the frequency changer 25 need be but one-half the size and capacity that would be necessary for the speed control of a single induction motor having the joint capacity of the motors 23 and 24. This saving of space and weight is of extreme importance where space limitations are encountered, as in locomotive practice.

While I have shown my invention in its preferred forms, it will be obvious to those skilled in the art that it is not so limited but is susceptible of various minor changes and modifications without departing from the spirit thereof and I desire, therefore, that only such limitations shall be placed thereupon as are imposed by the prior art or specifically set forth in the appended claims.

I claim as my invention:

1. The method of accelerating a multi-speed induction motor aggregate, embodying a plurality of windings to the full operating speed of said aggregate in conjunction with a source of alternating current and a variable frequency changer, having but one half the capacity of said motor aggregate which comprises connecting said windings in cascade, supplying energy first to one end of said cascade aggregate while returning a portion of the energy to said source through said frequency changer, subsequently passing through the synchronous speed of said cascade aggregate, then supplying energy to both ends of said aggregate to increase the speed to substantially 200% of the synchronous speed of said cascade aggregate, and thereafter connecting said windings for parallel operation at the full operating speed of said aggregate.

2. The method of accelerating a plurality of induction motors to their full operating speed in conjunction with a source of alternating current and a variable frequency changer having but one half the capacity of said plurality of motors, which comprises connecting said motors in cascade, connecting said source to one end of said cascade aggregate and connecting said frequency changer to the other end of said cascade aggregate, raising the speed of said aggregate from 0 to 200% of the synchronous speed of said aggregate by varying the conversion ratio and phase rotation of said frequency changer, and finally connecting said motors in parallel directly to said source.

3. The method of accelerating an induction motor aggregate which is adapted for a plurality of connections giving a number of different synchronous speeds in conjunction with a source of alternating-current supply and an auxiliary variable-frequency machine, which comprises establishing connections for a low synchronous speed with said source connected to one portion of said aggregate and with said auxiliary machine connected to another portion of said aggregate, raising the motor-aggregate speed from below to above synchronous speed of said low-speed connection by adjusting the frequency and phase rotation of said frequency changer until the synchronous speed of another higher-speed motor connection is reached, and then establishing such motor connection as will give said higher synchronous speed.

4. The method of accelerating a plurality of induction motors to their full operating speed in conjunction with a source of alternating current, a variable frequency changer having but one half the capacity of said plurality of induction motors, means for varying the conversion ratio of said frequency changer and means for reversing the phase sequence of said frequency changer, which comprises connecting said motors in cascade, connecting said source to one end of said cascade aggregate and connecting the other end of said cascade aggregate to said frequency changer, decreasing the frequency of said frequency changer until synchronous speed of said cascade aggregate is reached, reversing the phase sequence of said frequency changer, then increasing the frequency of said frequency changer until 200% of the synchronous speed of said cascade aggregate is reached, and finally connecting said motors for parallel operation at their full normal operating speed.

In testimony whereof I have hereunto subscribed my name this 27th day of April, 1917.

RUDOLF E. HELLMUND.